US006304417B1

(12) United States Patent
Bracken et al.

(10) Patent No.: US 6,304,417 B1
(45) Date of Patent: *Oct. 16, 2001

(54) MECHANISM TO CLAMP MAGNETIC DISK AGAINST CARTRIDGE SHELL

(75) Inventors: Allen T. Bracken, Layton, UT (US); James Blum, San Jose; George T. Krieger, Carmel, both of CA (US)

(73) Assignee: Iomega Corporation, Roy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/118,635

(22) Filed: Jul. 17, 1998

Related U.S. Application Data

(63) Continuation-in-part of application No. 08/834,188, filed on Apr. 15, 1997, now Pat. No. 5,862,026, which is a continuation of application No. 08/550,818, filed on Oct. 31, 1995, now Pat. No. 5,650,899, which is a continuation-in-part of application No. 08/477,764, filed on Jun. 7, 1995, now abandoned.

(51) Int. Cl.[7] .................................................. G11B 23/03
(52) U.S. Cl. ............................................................ 360/133
(58) Field of Search .............................. 360/133; 369/291, 369/290, 289, 270

(56) References Cited

U.S. PATENT DOCUMENTS 5,862,026 * 1/1999 Schick et al. ......................... 360/133
5,991,130 * 11/1999 Schick et al. ......................... 360/133
6,021,029 * 2/2000 Mamiya et al. ...................... 360/133

* cited by examiner

Primary Examiner—William Klimowicz
(74) Attorney, Agent, or Firm—Woodcock Washburn Kurtz Mackiewicz & Norris LLP

(57) ABSTRACT

A data storage cartridge has a recording medium and a door covering an opening in the shell. The door is opened when the cartridge is inserted into the drive and closed when the cartridge is removed from the drive. A movable member rotates in cooperation with a stationary member by an actuating arm that is coupled to the door. Preferably, a screw/nut mechanism is operated by the opening and closing of the door to actuate a clamping mechanism which clamps the recording against a planar wall of the shell when the cartridge is removed from the drive.

20 Claims, 11 Drawing Sheets

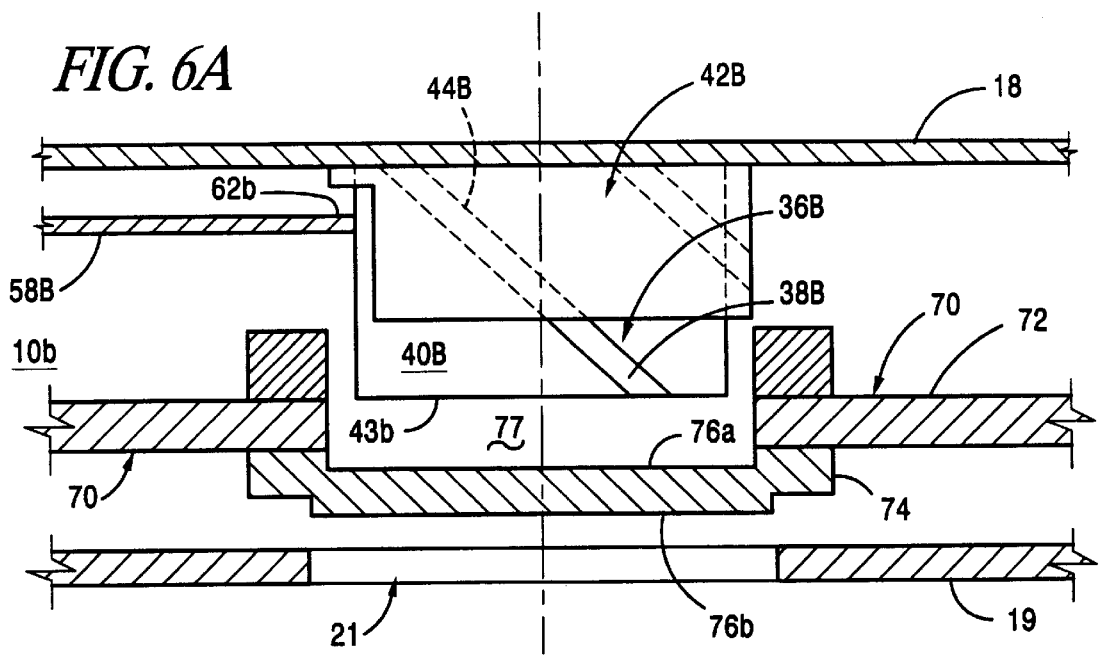
FIG. 6A
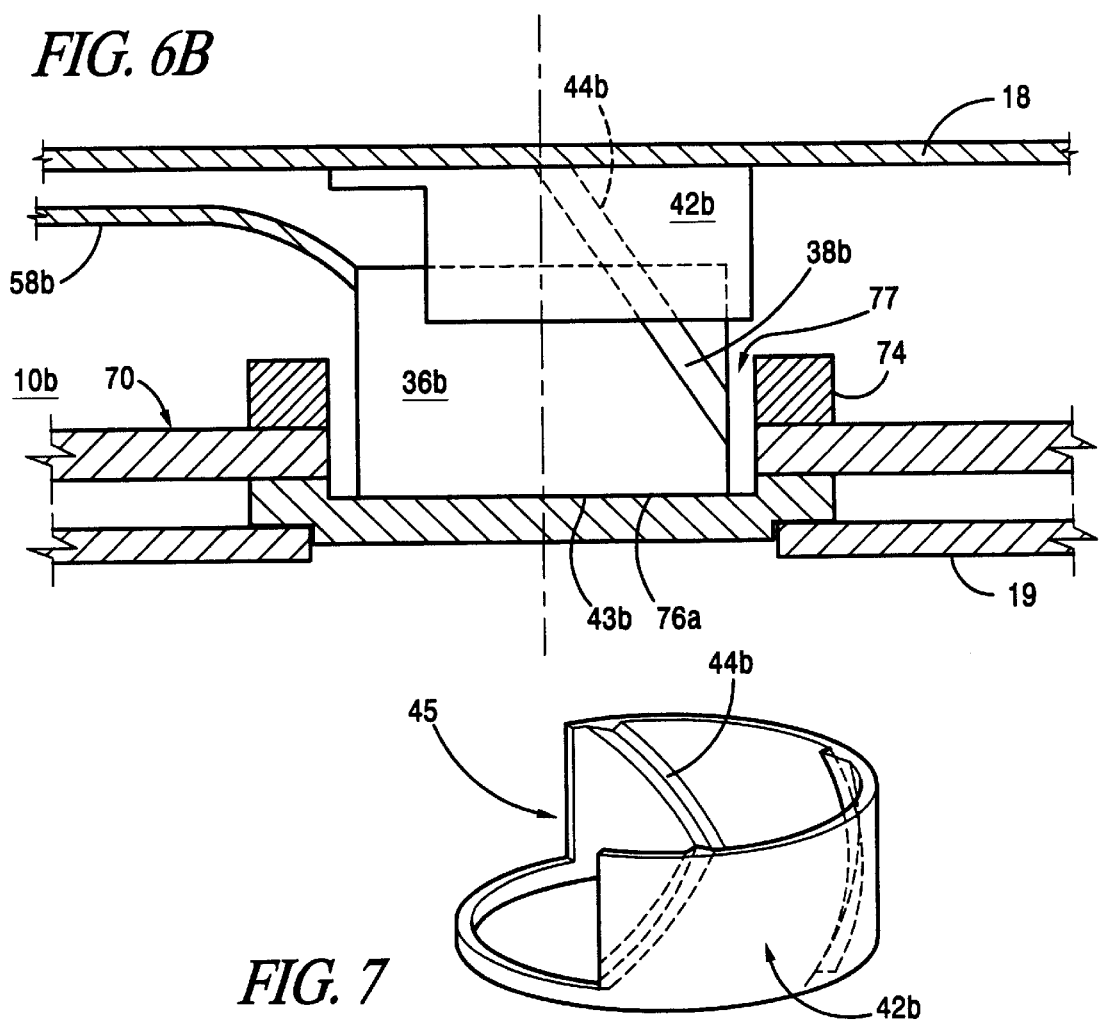
FIG. 6B
FIG. 7

MECHANISM TO CLAMP MAGNETIC DISK AGAINST CARTRIDGE SHELL

Cross Reference to Related Applications: this application is a continuation-in-part of co-pending U.S. application Ser. No. 08/834,188, now U.S. Pat. No. 5,862,026, filed Apr. 15, 1997, which is incorporated herein by reference in its entirety, and which is a continuation of U.S. application Ser. No. 08/550,818, (which issued as U.S. Pat. No. 5,650,899) filed Oct. 31, 1995, which is a continuation-in-part of U.S. pat. application Ser. No. 08/477,764, filed Jun. 7, 1995, which is now abandoned.

FIELD OF THE INVENTION

This invention relates to data storage drives and more particularly, to a removable cartridge for magnetic disk drives.

BACKGROUND

Magnetic disk drives which write and read digital data from flexible magnetic disks have been extensively used. "Floppy disk drives" have been extensively used for small, so-called microcomputer systems, for word-processing applications and the like. The flexible disk cartridge includes a relatively thin, flexible jacket which is inserted into the floppy disk drive.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452—Thompson et al is an example of such a drive. "Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748—Bauck, et al and related patents to the common assignee show such drives using Bernoulli stabilized flexible disks. U.S. Pat. No. 4,901,173—Jones et al and related patents to the common assignee, show improvements which relate to so-called "half height" drives.

The cartridges for these drives have a door which closes the cartridge when it is removed from the drive. This prevents debris from contaminating the magnetic recording medium when the cartridge is not in the drive. When the cartridge is inserted into the drive, this door slides to an open position to provide access for the magnetic recording heads to engage the recording medium.

When the cartridge is removed from the drive, it is often subject to rough handling. During handling, physical contact of the disk with the shell may damage the disk, particularly if the disk and cartridge shell are subject to excessive "rattling".

U.S. Pat. No. 5,444,586, Iftikar, et al. discloses a mechanism for clamping the cartridge against the cartridge shell when the cartridge is removed from the drive and releasing the clamping mechanism when the cartridge is inserted into the drive. In the Iftikar, et al patent a nut and screw mechanism is actuated by a tang which is rotated as the cartridge is inserted into the drive. Unfortunately, such a design requires added complexity of the drive because the mechanism to actuate the tang is disposed within the drive, as distinguished from within the cartridge.

U.S. Pat. No. 5,650,899 Schick, et al. discloses a cam mechanism which clamps the hub against the cartridge shell as the access door of the cartridge is opened and closed when the cartridge is inserted into or ejected from the drive.

It is a goal of the present invention to provide an advantageous clamping mechanism which is actuated by the opening and closing of the cartridge door as it is inserted into and ejected from the drive, which optimizes head space, which reduces the number of moving parts, and which diminishes rattling of the cartridge while the cartridge is outside of the drive.

SUMMARY OF THE INVENTION

In accordance with the present invention, a clamping mechanism in a data storage cartridge includes a movable member and a stationary member. The mechanism is actuated by the door of the cartridge which is opened when the cartridge is inserted into the drive and is closed when the cartridge is removed from the drive. The mechanism of the present invention restrains the recording medium to prevent rattling when the cartridge is removed from the drive, i.e. when the door is closed. The clamping mechanism is disposed on the same axis as the rotatable recording medium.

When the door is closed the clamping mechanism translates the motion of the door closing into a surface that clamps the hub on which the recording medium is mounted against a rear wall of the cartridge. Preferably, the clamping mechanism is at least partially located in a cavity formed in the hub while the clamping mechanism is in the clamped position, although such location is not necessary. The clamping mechanism comprises a stationary member and a movable member. The stationary member is affixed to the planar surface of the cartridge. The movable member is operationally coupled to the door via an actuating arm, and movably coupled to the stationary member such that as the door opens and closes, the movable member is rotated on the stationary member. The door movement, thus, causes axial motion of the clamping mechanism which is disposed in a cavity in the hub. A surface of the clamping mechanism bears against the disk hub to clamp the disk hub against the planar wall of the cartridge.

Four embodiments of the present invention are provided, each of which provides an actuating arm that is coupled to the cartridge door, a stationary member that is rigidly connected to the cartridge shell, and a movable member that is coupled to the stationary member. The actuating arm rotates the movable member, which is coupled to the stationary member such that rotation of the movable member produces axial translation of the movable member. The movable member translates toward the recording medium housed within the cartridge while the cartridge is removed from the drive so as to clamp the recording medium between a contact surface of the movable member and the cartridge shell.

In the first two embodiments, a spring that is coiled around the axis of rotation provides torsion to the movable member, which are a nut and a screw, respectively, to bias the movable member toward the camped position. In the third embodiment, a helical spring is disposed near the periphery of the movable member, which is a screw, to bias the movable member toward the clamped position. The fourth embodiment lacks a spring to bias the movable member, which is a spiral spring and plate assembly. Therefore, the clamping mechanism of the fourth embodiment may either be actuated entirely by the door, or may be biased by a spring coupled to the actuating arm.

The present invention produces the advantage that the mechanism for actuating the clamping mechanism is disposed within the cartridge shell, preferably within a cavity in the disk hub, which saves vertical space within the drive and reduces complexity. Further, providing a clamping mechanism that has only one moving part (in addition to the door and the actuating arm) within the cartridge produces less debris, which is an important and growing consideration with increasing areal density of the magnetic information.

The present invention encompasses any clamping mechanism that is operatively coupled to the cartridge door and that includes a movable member that is coupled to a stationary member such that rotation or pivoting of the movable member results in axial translation. For example, the present invention encompasses a screw/nut combination regardless of whether the movable member clamps the recording medium against the top or the bottom of the cartridge shell, or whether the screw or the nut comprises the movable member Further, in addition to a nut and screw arrangement, the present invention encompasses a protrusion (for example, a pin) that slides within a helical or inclined groove, and also a helix or helically oriented members that slide within a helical groove—regardless of whether the grooves are disposed in the stationary or movable member. Further, the terms "screw" and "nut" are broadly used herein to comprise threads of any type on either or both the movable member and stationary member.

The foregoing and other objects, features and advantages of the invention will be better understood from the following more detailed description and appended claims.

SHORT DESCRIPTION OF THE DRAWINGS

FIGS. 6A and 6B are cross sectional views illustrating a second embodiment of the present invention in an unclamped and clamped position, respectively;

FIG. 7 is a portion of the embodiment shown in FIGS. 6A and 6B;

DESCRIPTION OF PREFERRED EMBODIMENTS

Figure 1A:
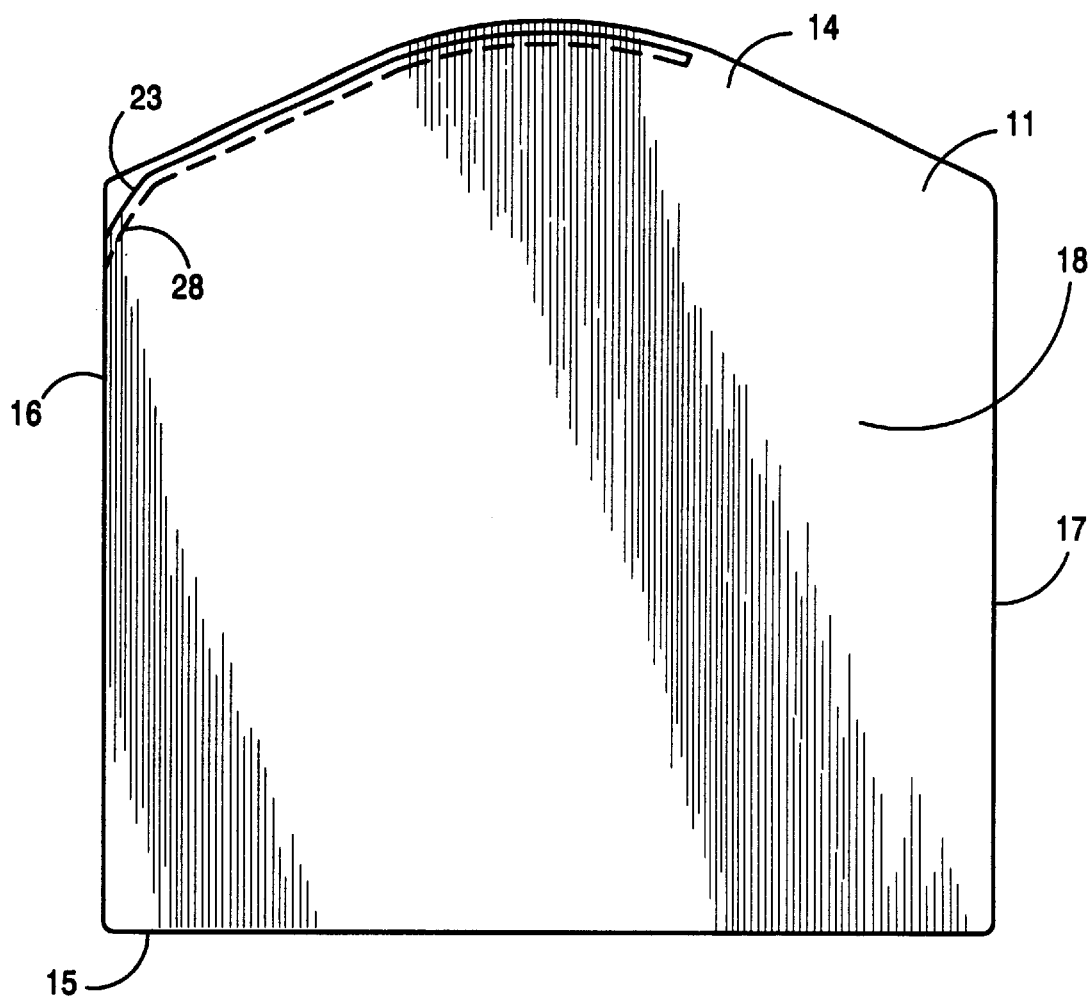
FIG. 1A shows a top view of the cartridge of the present invention.
Figure 1B:
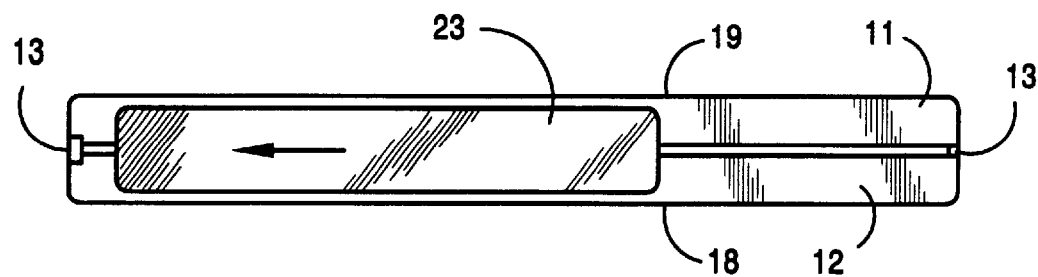
FIG. 1B is a front view of the cartridge.
Figure 3A:
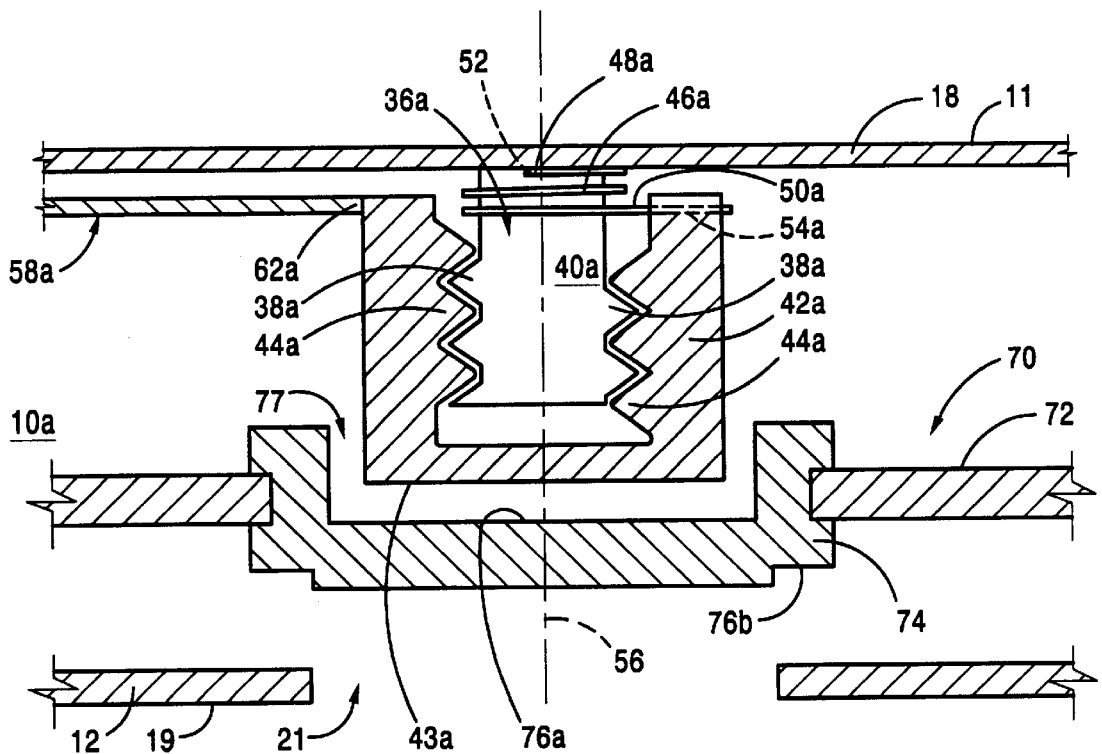
FIGS. 3A and 3B are cross sectional views illustrating a first embodiment of the present invention in an unclamped and clamped position, respectively.

FIGS. 1A and 1B show a cartridge having two half shells 11 and 12 joined together at 13. The cartridges has a front 14, a back 15, and two sides 16 and 17. Between the two sides are two substantially flat, planar surfaces: shell first planar surface 18 and shell second planar surface 19, which have four edges that connect to the front 14, back 15, and sides 16 and 17. An opening 20 in the front of the cartridge provides access by the read/write heads to the recording medium disposed within the cartridge. A flexible door 23 covers the opening 20 when the cartridge is removed or is outside of the drive. Door 23 sides in tracks 28 disposed in the planar surfaces 18 and 19. A spindle motor aperture 21, best shown in FIG. 3A, is disposed in surface 19.

Figure 2A:
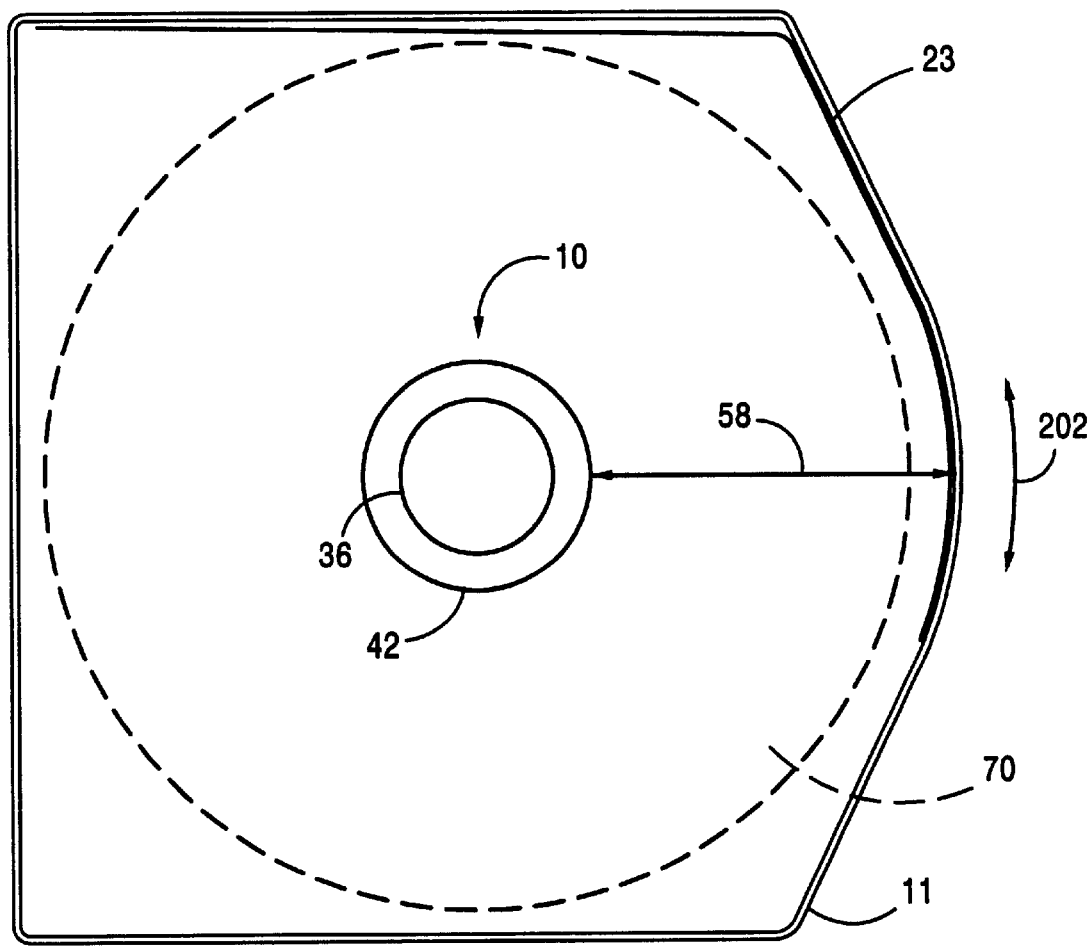
FIG. 2A is a schematic view of the present invention.
Figure 2B:
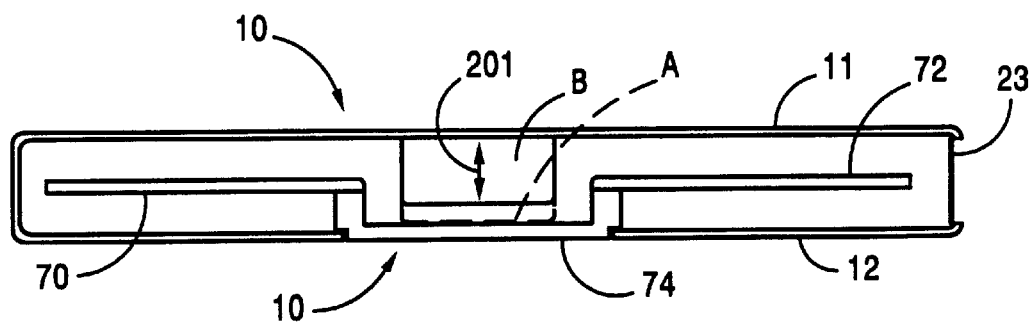
FIG. 2B is another schematic view of the present invention.

When a cartridge, such as the cartridge of FIGS. 1A and 1B is not in use (e.g., outside of a disk drive), it is desirable to fix the recording medium into place such that it cannot "rattle" inside of the cartridge shell. The following discussion uses reference numerals with corresponding letters to refer generally to parts of the invention. Description of particular embodiments below use these reference numerals consistently, and add a letter designation to distinguish embodiments. FIG. 2A and 2B illustrates the operation of a clamping mechanism of the invention that prevents the recording medium from rattling within the cartridge. The cartridge further comprises a recording medium 70, including a platter 72 that is fixed to a hub 74, a clamping mechanism 10, and an arm 58. Clamping mechanism 10 is disposed within a center hollow 77 of hub 74, and arm 58 is coupled between door 23 and clamping mechanism 10. As a result of the coupling of arm 58 to door 23, when door 23 moves in the direction indicated by arrow 202, the arm 58 moves concurrently. This movement of door 23 and arm 58 actuates clamping mechanism 10 between positions A (shown in phantom) to clamp medium 72 against cartridge shell 12 or B to release recording medium 72.

Clamping mechanism 10 generally comprises two members 36, 42—one stationary and another movable. The present invention contemplates two configurations for clamping mechanism 10. In the first configuration member 36 is stationary, e.g., fixed to shell 11, and member 42 rotates around stationary member 36. Alternatively, in another configuration, member 42 is stationary (e.g., fixed to shell 11) and movable member 36 rotates within stationary member 42. Exemplary embodiments of these two configurations, as well as others, are provided herein below. In either configuration, the movable member is coupled to door 23 via arm 58. The movable member translates the motion of door 23 into a rotary motion about the other member so that the movable member is thereby translated axially. The axial motion provides a force within hub 74 to clamp against shell 12.

As shown in the figures, arm 58 (including specific embodiments 58a,b,c,d) preferably is able to flex so that an end that is coupled to the movable member may easily move axially with the movable member. Further, arm 58 is operationally coupled to door 23, which includes a catch (not shown). The drive engages the catch as the cartridge enters the drive so as to pull the door along the side of the cartridge. Preferably the catch is pulled along the outside of the cartridge. The present invention encompasses doors having a catch formed integrally thereon and doors having a catch that are attached thereon as a separate member or strap, and encompasses doors that travel along the inside wall of the cartridge and that travel along the outside wall when the door is proximate its fully open position.

As will be described fully below, screw 36a, nut 42b, nut 42c, post 108, and stationary member 36a' are provided as examples of stationary members according to the present invention. Nut 42a, screw 36b, screw 36c, the assembly comprising coil 96 and plate 102, and movable member 42a' are provided as examples of movable members according to the present invention. Other embodiments of stationary and movable members within the scope of the present invention will be apparent to those generally familiar with cartridges.

Referring to FIGS. 3A, 3B, 4 and 5 to illustrate a first embodiment of the present invention, a clamping mechanism 10a is actuated as the door 23 is opened and closed. Mechanism 10a, which is rotatable on the same axis 56 on which a recording medium rotates, comprises a screw 36a, a nut 42a, and a coil spring 46a, and is coupled to an actuating arm 58a.

Figure 4:
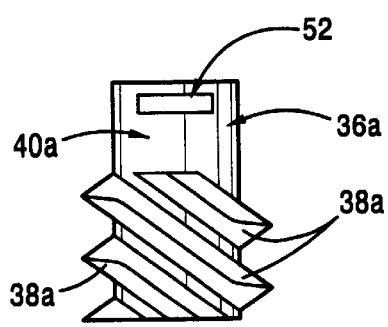
FIG. 4 is a view of a portion of the embodiment shown in FIGS. 3A and 3B.

Screw 36a comprises a post 40a and screw threads 38a. Preferably, post 40a is rigidly connected to planar surface 18 opposite spindle motor aperture 21 disposed in planar surface 19. Post 40a may be integrally molded into planar surface 18 in one piece, or may be formed as a separate piece and connected to surface 18 by welding or gluing, or by a screw through surface 18 and into post 40a. Screw threads 38a, preferably three or four, are disposed on post 40a, preferably in a helical pattern. Post 40a has a post slot 52 disposed therein that may be formed as a recess or slotted hole. FIG. 4 shows screw 36a with exemplary threads 38a and slot 52a in greater detail.

Figure 5:
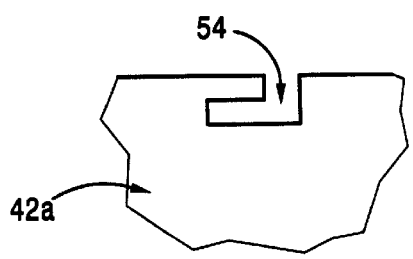
FIG. 5 is a portion of the embodiment shown in FIGS. 3A and 3B.

Nut 42a, which is preferably shaped as a hollow cylinder with and open end and a closed, comprises nut threads 44a, a clamping surface 43a, and a nut slot 54. Nut threads 44a preferably are disposed on the inside surface of nut 42a. Clamping surface 43a is disposed on nut 42a proximate the recording medium 70, as will be described below. FIG. 5 shows an enlarged view of the nut slot 54.

Figure 12:
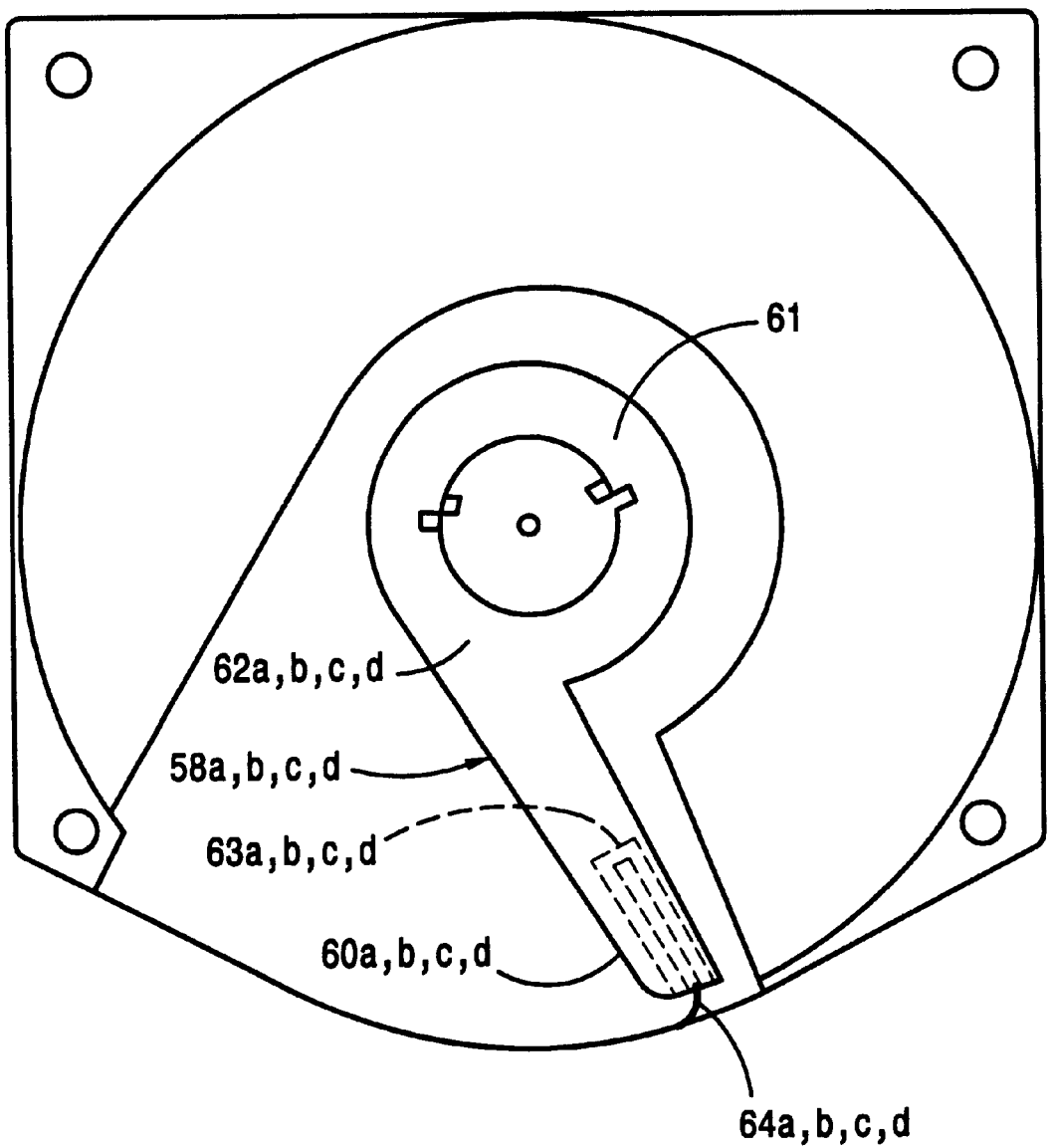
FIG. 12 shows a view of an actuating arm.

Actuating arm 58a, which is also shown in FIG. 12, includes a door end 60a for coupling arm 58a to door 23, and a clamp mechanism end 62a.

Coil spring 46a is preferably a helical spring, preferably having several turns, that has a first end 48a and a second end 50a, each of which are bent substantially radially from the coil. Spring 46a is disposed around post 40a, preferably proximate shell surface 18. Spring end 48a is disposed in post slot 52 and spring end 50a is disposed in nut slot 54. Spring 46a provides torsion (the direction of which depends on the orientation of threads 38a and 44a) so as to rotate nut 42a in a direction that translates nut 42a away from shell surface 18 and into contact with recording medium 70.

FIG. 3A shows the clamping mechanism 10a in a retracted position corresponding to the cartridge door 23 in an open position. Nut 42a is threaded onto screw 36a such that nut 42a is in its fully retracted position, and closest to shell planar surface 18. Coil spring 46a is urging nut 42a to unscrew from screw 36a, but is unable to produce motion because door 23 is held open by a mechanism within the drive (not shown). Recording medium 70 is unencumbered from both clamping mechanism 10a and shell surfaces 18 and 19 so that a drive spindle motor (not shown), which accesses a disk hub 74 at surface 76b through aperture 21, may spin recording medium 70.

Figure 3B:
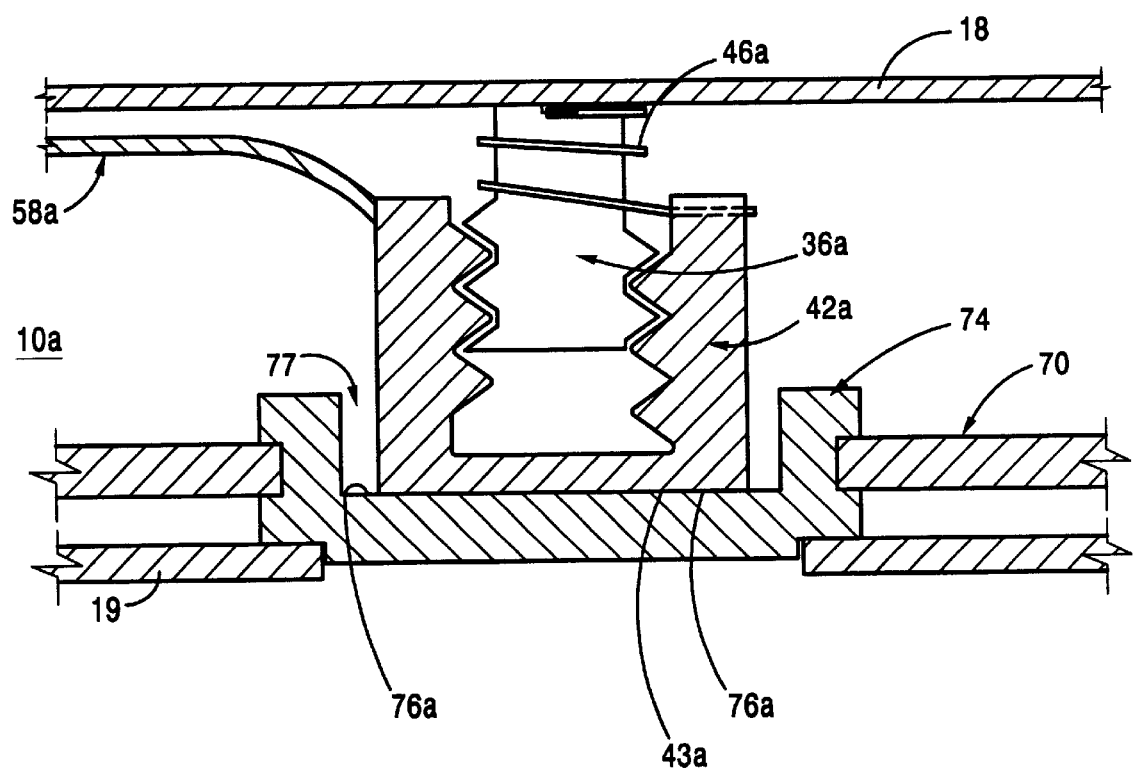

When the cartridge is to be removed from the drive, spring 46a urges nut 42a to screw away from planar surface 18 and to clamp against recording medium 70. Spring 46a may provide sufficient torsion to drive nut 42a and to drive door 23 from its open to its closed position, or a mechanism within the drive may help drive the door closed, and therefore augment the torsion of spring 46a. FIG. 3B shows clamping mechanism 10a in an expanded position corresponding to cartridge door 23 in a fully closed position. Nut 42a has been fully rotated by door 23 such that nut 42a has translated axially away from surface 18. Clamping surface 43a urges against hub contact surface 76a to force hub 74 against shell surface 19 so as to clamp recording medium 70 against the shell half 12.

Referring to FIGS. 6A and 6B to illustrate a second embodiment of the present invention, a clamping mechanism 10b is similar to first embodiment clamping mechanism 10a in that there is one stationary threaded part and one movable threaded part. Clamping mechanism 10b comprises a screw 36b, a nut 42b, and a coil spring (which is similar to spring 46a shown in FIGS. 3A and 3B, but which is omitted from FIGS. 6A and 6B for clarity), and is coupled to an actuating arm 58b. Unlike mechanism 10a, nut 42b is stationary and screw 36b rotates and translates on nut 42b.

Nut 42b comprises nut threads 44b and a door slot 45. Nut 42b is preferably shaped as a hollow, short cylinder with and open end and another end that is rigidly connected to planar surface 18 opposite spindle motor aperture 21. Nut 42b may be integrally molded into planar surface 18 in one piece, or may be formed as a separate piece and connected to surface 18 by welding or gluing, or by several screws (not shown) through surface 18 and into nut 42b. Door slot 45 provides an open portion on the side of nut 42b to provide access to screw 36b by arm 58b. Nut threads 44b preferably are disposed on the inside surface of nut 42b. FIG. 7 shows an enlarged view of nut 42b.

Screw 36b comprises a post 40b, screw threads 38b, and movable clamping surface 43b. Screw threads 38b, preferably three or four, are disposed on post 40a, preferably in a helical pattern. Screw threads 38b are shown schematically in FIG. 6A to illustrate that the present invention encompasses a groove (generally located similar to threads 38b) that receives a protruding thread 44b as shown in FIG. 7. Post 40a has a post slot 52 (not shown for clarity) disposed therein that may be formed as a recess or slotted hole. Screw 36b interacts with nut 42b by screwing nut threads 38b in mesh with threads 44b. Clamping surface 43b is disposed on screw 36b proximate the recording medium 70, as will be described below.

Actuating arm 58b, which is also shown in FIG. 12, includes a door end 60b for coupling arm 58b to door 23, and a clamp mechanism end 62b. The coil spring (not shown) is disposed substantially between screw 36b and nut 42b, and provides torsion to rotate screw 36b away from planar surface 18.

FIG. 6A shows the clamping mechanism 10b in a retracted position corresponding to the cartridge door 23 in an open position. Screw 36b is threaded into nut 42b such that screw 36b is in its fully retracted position, and closest to shell planar surface 18. The coil (not shown) is urging screw 36b to unscrew from nut 42b, but is unable to produce motion because door 23 is held open by a mechanism within the drive (not shown). Recording medium 70 is unencumbered in this position and may spin freely, as described above.

When the cartridge is to be removed from the drive, the spring (not shown) urges screw 36b to screw away from planar surface 18 and to clamp against recording medium 70. The spring (not shown) may provide sufficient torsion to drive screw 36b and to drive door 23 from its open to its closed position, or a mechanism within the drive may help drive the door closed, and therefore augment the torsion of the spring (not shown). FIG. 6B shows clamping mechanism 10b in an expanded position corresponding to cartridge door 23 in a fully closed position. Screw 36b has been full rotated by door 23 such that screw 36b has translated axially away from surface 18. Clamping surface 43b urges against hub contact surface 76a to force hub 74 against shell surface 19 so as to clamp recording medium 70 against the shell half 12.

Figure 8A:
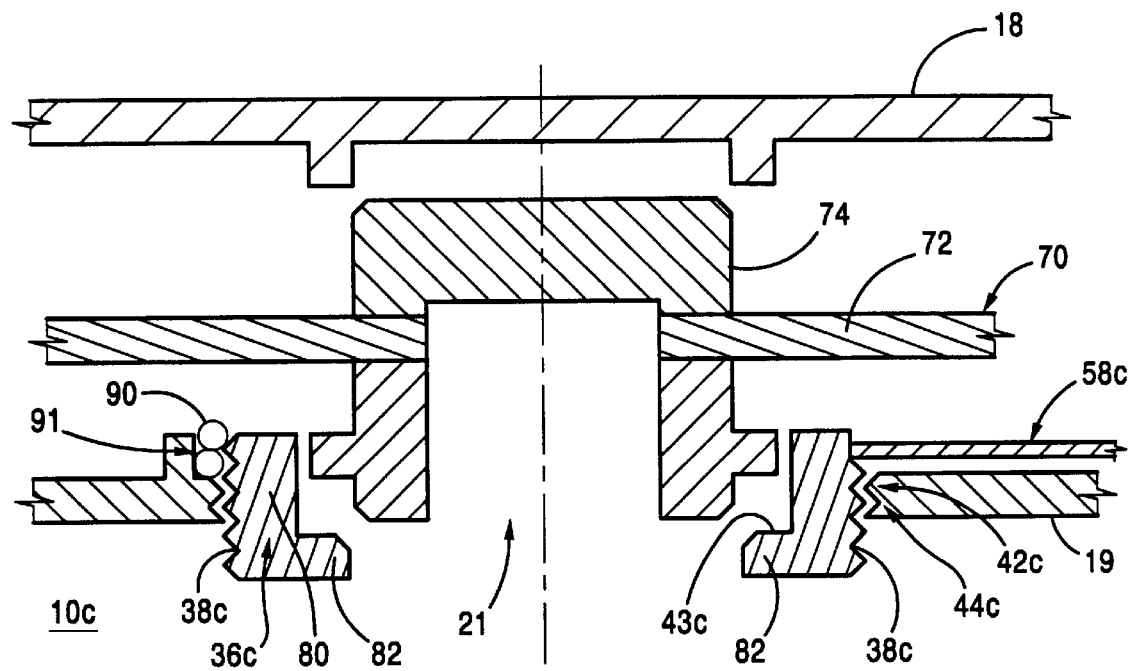
FIGS. 8A and 8B are cross sectional views illustrating a third embodiment of the present invention in an unclamped and clamped position, respectively.
Figure 8B:
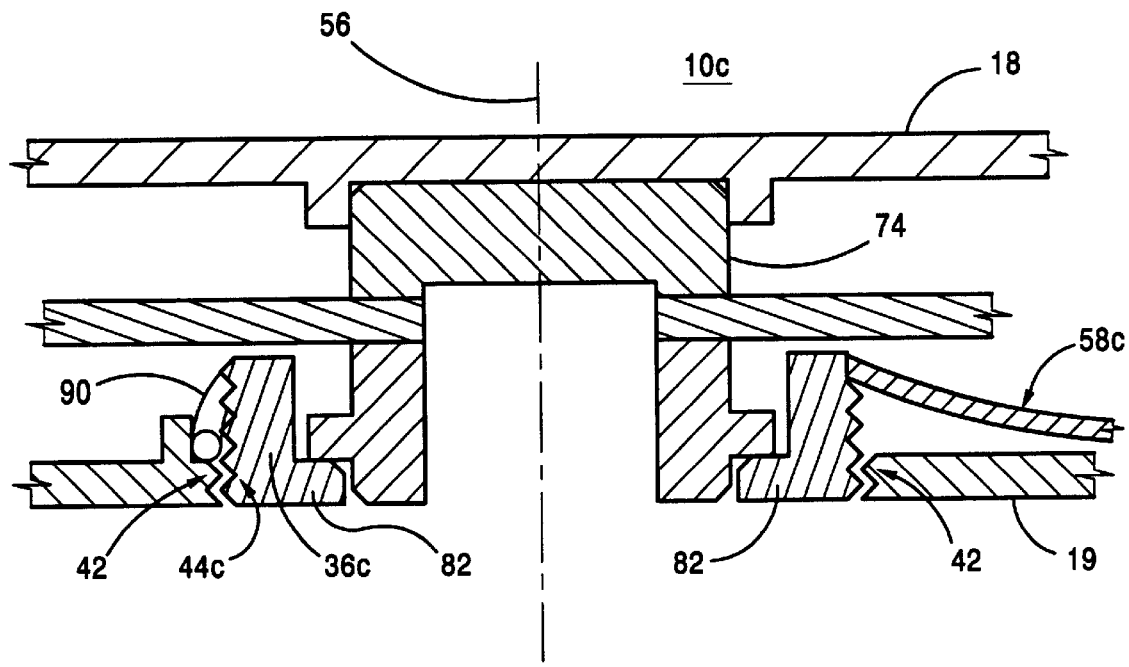
Figure 9:
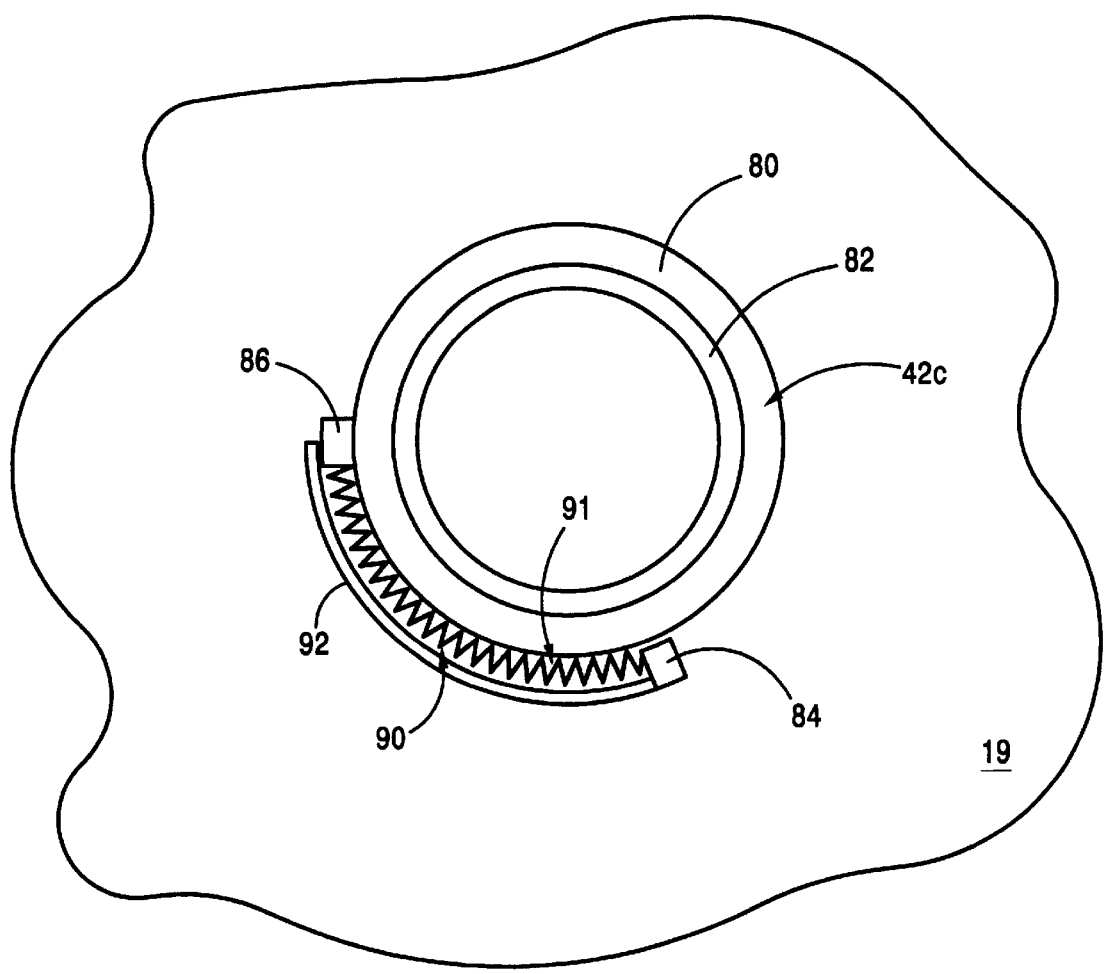
FIG. 9 is a view of a portion of the embodiment shown in FIGS. 8A and 8B.

Referring to FIGS. 8A, 8B, and 9 to illustrate a third embodiment of the present invention, a clamping mechanism 10c comprises a screw 36c, a nut 42c, and a helical spring 90, and is coupled to an actuating arm 58c.

Screw 36c comprises a cylindrical portion 80, an internal flange 82, a contact shoulder 43c, screwthreads 38c, and a screw spring anchor 86 (shown in FIG. 9). Screw 38c is preferably open at both ends of cylindrical portion 80, and has an internal flange 82 disposed on the spindle motor side of cylindrical portion 80. Contact shoulder 43c is formed on the interior upper surface of flange 82. Threads 38c are sized to mesh with nut threads 44c. The interior upper corners of flange 82 and the corresponding corners of disk hub 74 may be beveled (not shown) to provide self-alignment during clamping. Referring specifically to FIG. 9, spring anchor 86 comprises a radial tab on the exterior portion of cylindrical portion 80. Alternatively, spring anchor 86 may be formed on arm 58c.

Nut 44c, which preferably is formed on the rim of second surface 19 formed by aperture 21, comprises nut threads 44c. The invention also encompasses providing a shell having a thickened portion in the rim region in the direction of axis of rotation 56 to provide greater depth for threads 44c. Further, nut threads 44c may be finer and more numerous than corresponding threads 44a and 44b because of the comparatively lesser depth.

Helical spring 90 is disposed between an anchor 84 (shown in FIG. 9), which is fixed to surface 19, and anchor 86, and biases screw 36c toward the clamped, upward direction. Proximate one point on the circumference of nut 42c, an arcuate spring retainer 92 is formed to prevent spring 90 from bowing in the radial direction, although spring 90 may be designed such that it is under constant tension. Preferably, retainer 92 comprises an arcuate wall and a recessed portion 91 of surface 19 that provides a space to house spring 90. Because spring 90 is partially within recessed portion 91, the retainer 92 is shorter and the vertical dimension of spring 90 over surface 19 is diminished.

FIG. 8A shows the clamping mechanism 10c in a retracted position corresponding to the cartridge door 23 in an open position. Screw 36c is threaded into nut 42c such that nut 42c is in its fully retracted position, and farthest from shell planar surface 18.

Helical spring 90 biases screw 36c to rotate and translate toward the clamped position. Spring 90 may provide sufficient torsion to drive nut 42c and to drive door 23 from its open to its closed position, or a mechanism within the drive may help drive the door closed, and therefore augment the torsion of spring 90.

FIG. 8B shows clamping mechanism 10c in a clamped position corresponding to cartridge door 23 in a fully closed position. Screw 36c has been fully rotated by door 23 such that screw 36c has translated axially toward recording medium 70. Contact surface 70 urges against hub contact surface 76a to force hub 74 against shell surface 18 so as to clamp recording medium 70 against the shell half 11.

Figure 10A:
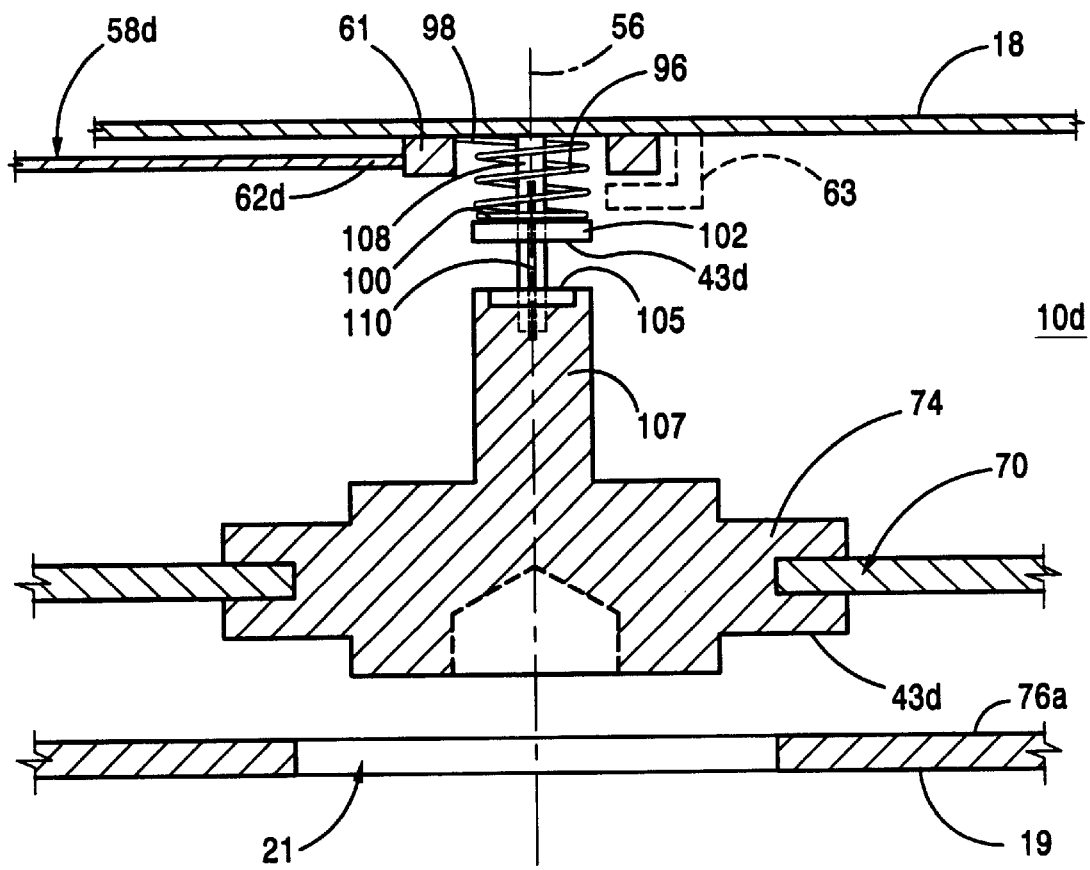
FIGS. 10A and 10B are cross sectional views illustrating a fourth embodiment of the present invention in an unclamped and clamped position, respectively.
Figure 11:
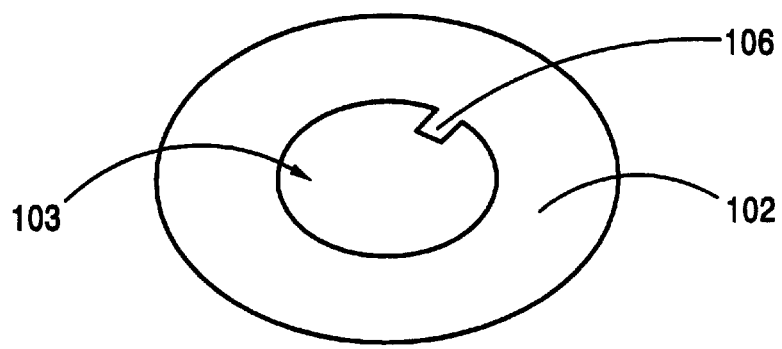
FIG. 11 is a view of a portion of the embodiment shown in FIGS. 9A and 9B.
Figure 10B:
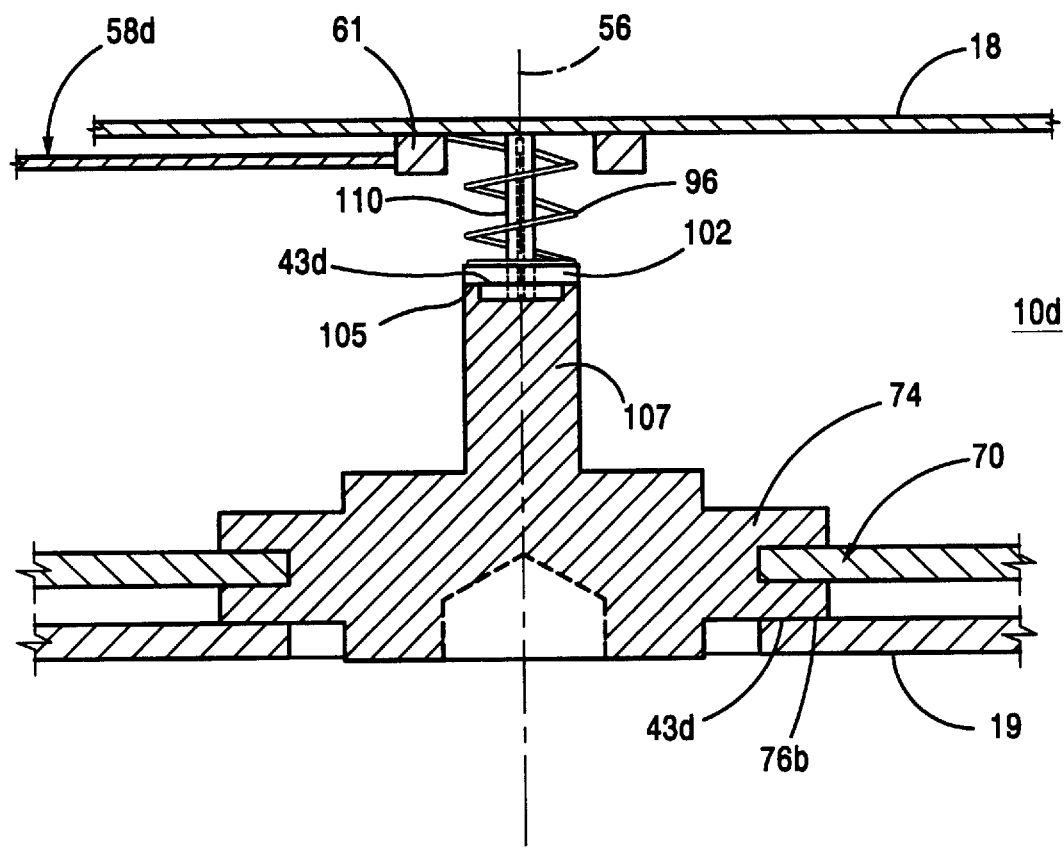

Referring to FIGS. 10A, 10B, and 11 to illustrate a fourth embodiment of the present invention, clamping mechanism 10d comprises a helical coil 96, a contact plate 102, and a post 108, and is coupled to actuating arm 58d. Post 108 is fixed to the surface 18 concentric with axis 56, and may be integrally molded into planar surface 18 in one piece, or may be formed as a separate piece and connected to surface 18 by welding or gluing, or by several screws (not shown) through surface 18 and into post 108. Post 108 has a longitudinal keyway 110 formed therein that is disposed on its end opposite its fixed end.

Helical coil 96, which is substantially concentrically disposed around the axis of rotation 56, comprises a first end 98 that is coupled to actuating arm 58d at a central circular potion 61 proximate surface 18, and a second end 100 that is coupled to plate 102.

Plate 102 is preferably a circular disk that is rigidly coupled to the second end 100 of coil 96, and has center cutout portion 103 and a key portion 106 that protrudes into center cutout 103 and that is insertable into keyway 110 in the post 108. Key 106 may slide freely longitudinally within keyway 110, and plate 102 preferably is perpendicular to axis 56. Plate 102 has a contact surface 43d disposed on its side facing recording medium 70.

Actuating arm 58d, which is also shown in FIG. 12, includes a door end 60d for coupling arm 58d to door 23, a circular portion disposed substantially concentric with post 108, and a clamp mechanism end 62d. Arm 58d is movably fixed to shell surface 18 in a way that enables arm 58d to rotate or pivot, but which keeps arm 58d substantially flat against surface 18. For example, multiple retainer clamps 63, shown in relief in FIG. 10A may be used at points around the circumference of the circular portion of arm 58d to prevent arm 58 from moving away from surface 18 yet enable arm 58 to rotate or pivot around post 108.

FIG. 10A shows the clamping mechanism 10d in a retracted position corresponding to the cartridge door 23 in an open position. Plate 102 is in its closest position to surface 18 with coil 96 connected between arm 58d and plate 102. Plate 102 is at rest on top of coil 96 with key 106 disposed in keyway 110. Recording medium 70 is unencumbered in this position and may spin freely, as described above.

When the cartridge is to be removed from the drive, arm 58d rotates or pivots around axis 56 in response to the door moving in a closing direction. FIG.10B shows clamping mechanism 10d in an expanded position corresponding to cartridge door 23 in a fully closed position. As door 23 closes, movement of arm 58d results in rotation of coil 96 in a direction that urges plate 102 to translate toward recording medium 70 along post 108. Plate 102 translation occurs in response to coil 96 rotation because plate 102 is prevented from rotating by key 106. Plate 102 moves toward recording medium 70 until contact surface 43d on plate 102 contacts a hub contact surface 105, which may be disposed on a hollow, longitudinally protruding portion 107 of hub 74. A shown in FIG. 10A, post 108 may be disposed within the hollow portion of protruding portion 107 while the cartridge is in the unclamped position. Therefore, adequate clearance between post 108 and the interior of protruding portion 107 so as to enable recording medium 70 to rotate freely during drive operation. When the door is in its fully closed position, contact surface urges against surface 105 and hub contact surface 76b urges against shell surface 19 so as to clamp recording medium 70. Although clamp mechanism 10d is illustrated using a disk hub having a protruding portion, clamp mechanism 10d according to the present invention may also be employed with disk hubs having a cavity, as shown in the first two embodiments.

Figure 13:
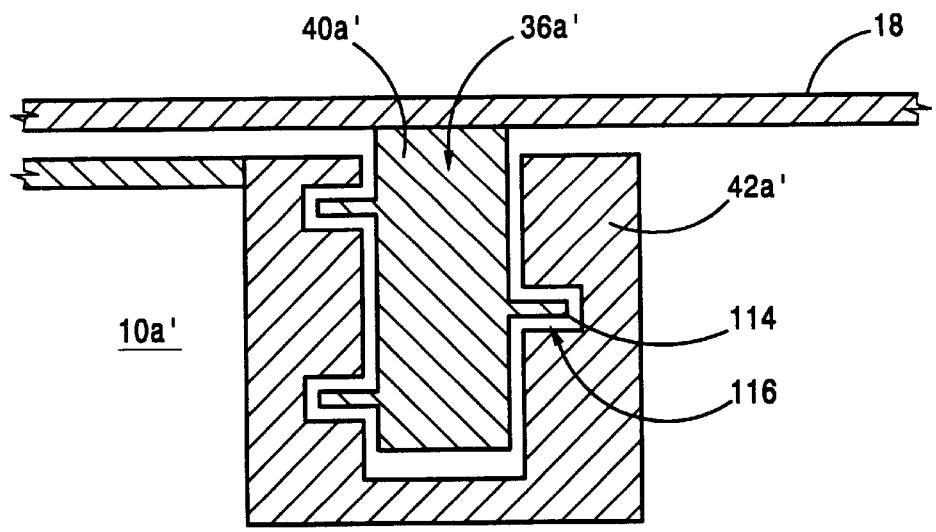
FIG. 13 is a view of an aspect of the present invention that may be employed with any of the first three embodiments.
Figure 14:
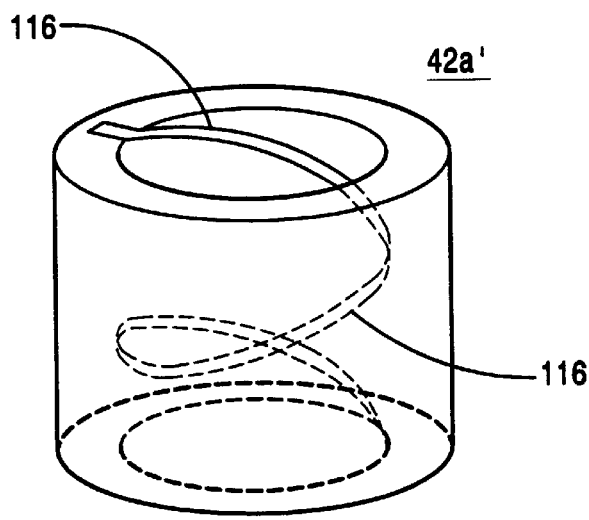
FIGS. 14 and 15 are perspective views of portions of the mechanism shown in FIG. 13.
Figure 15:
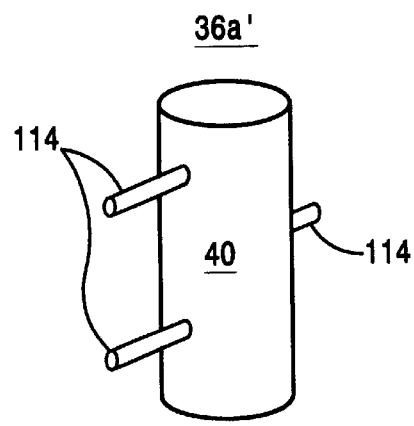

Although the first three embodiments have been described using threads on both the stationary and movable members, the present invention encompasses using other designs to translate the movable member in response to rotation by the actuating arm. FIGS. 13, 14, and 15 illustrate an alternate assembly that is similar to the first embodiment shown in FIGS. 3A and 3B, and that may be used to form the movable and stationary members according to the present invention Specifically, a clamping mechanism 10a' may be used in place of screw 36a and nut 42a shown in FIGS. 3A and 3B. Recording medium 70, spring 46a, and surface 19 have been omitted from FIG. 13 for clarity.

Clamping mechanism 10a' comprises a stationary member 36a', a movable member 42a', and is coupled to door 58a'. Stationary member 36a' comprises a post 40a' that is rigidly fixed to surface 18 and plural pins 114 extending substantially radially from post 40a'. Movable member 42a' comprises a hollow cylinder with a helical groove 116 formed on the inside surface capable of receiving pins 114.

In response to movement of door 23, movable member 42a' rides on pins 114 to translate relative to stationary member 36s', similar to as described with respect to the first embodiment.

Nuts 42a,b,c interact with screws 36a,b,c by screwing nut threads 44a,b,c in mesh with screw threads 38a,b,c with adequate clearance therebetween such that threads 38a,b,c and 44a,b,c do not deform. Such a clearance enables nut 42a, screw 36b, and nut 42c to rotate and translate on screw 36a, nut 42b, and screw 36c with a minimum amount of rotational force applied thereto.

Actuating arm 58a,b,c,d may include a telescoping wire 64 disposed in a recess opening 62a,b,c,d, in arm 58a,b,c,d, as more fully described in U.S. Pat. No. 5, 560, 899-Schick et al. to the present assignee, which is incorporated herein by reference in its entirety.

Although the present invention has been described with reference to a cartridge in which a flexible door travels along a radius of curvature that changes by angular position (that is, as shown in FIG. 1A), the present invention encompasses a cartridge in which a rigid door travels along an arc of constant radius. In the latter design, the door may be formed of rigid plastic or metal in a circular arc that travels in the circular track, and the actuating arm may span the entire arcuate segment of the door to form substantially a radial portion of a circle.

The terms "axial" and "axially" as used herein refer to an axis of rotation of the recording medium. The term "longitudinal" when used herein to any part of the clamping mechanism, refers to a direction or orientation substantially parallel to the axis of rotation of the recording medium.

While a particular embodiment has been shown and described various modifications may be made. The appended claims are, therefore, intended to cover all such modifications within the true spirit and scope of the invention.

What is claimed is:

1. A cartridge for a drive in which read/write heads read/record data on a recording medium comprising:
   a shell having a front, a back and two sides between substantially flat, planar surfaces;
   said recording medium being in said shell;
   said shell having an opening therein for access by said read/write heads to said recording medium;
   a door automatically covering said opening when said cartridge is removed from said drive;
   a screw having screw threads;
   a nut having threads engaging said screw threads;
   one of said screw and said nut being rigidly connected to said shell and the other being connected to said door so that movement of said door between positions covering said opening and not covering said opening causes relative movement between said screw and said nut; and wherein said relative movement is used to clamp said medium when said door is closed.

2. The cartridge recited in claim 1 wherein said screw is rotatable on the same axis as said recording medium and said nut is connected to said shell.

3. The cartridge recited in claim 1 wherein said nut is rotatable on the same axis as said recording medium and said screw is connected to said shell.

4. The cartridge recited in either one of claims 1 and 2 wherein said relative movement is in an axial direction with respect to the recording medium.

5. The cartridge recited in either one of claims 1 and 2 further comprising:
   a hub on which said recording medium is mounted, and a clamping means applying an axial force to said hub to clamp said medium against said planar surface of said shell.

6. The cartridge recited in claim 5 further comprising a coil spring disposed on an axis of the recording medium, said spring biasing said clamping means against said hub to clamp said medium against said planar surface when said door is closed.

7. The cartridge recited in claim 6 wherein said coil spring is compressed pulling said clamping means away from said hub as said door is opened.

8. The cartridge recited in claim 7 wherein said nut is attached to a planar shell and said screw is rotatable about said nut.

9. The cartridge recited in claim 6 wherein said spring returns said door to the closed position when said cartridge is removed from said drive.

10. The cartridge recited in claim 1 wherein said screw is attached to a planar surface of said shell, and said nut is rotatable about said screw by said door.

11. The cartridge recited in claim 10 wherein said screw is molded into said planar surface of said shell.

12. The cartridge recited in claim 1 wherein said one of said screw and said nut is connected to said door by a member rotatable about the axis of said recording medium.

13. The cartridge of claim 1 wherein the opening is disposed in the front.

14. A cartridge for a drive in which read/write heads read/record data on a recording medium, comprising:
   a shell having a front, a back and two sides between substantially flat, planar surfaces; said recording medium being in said shell;
   said shell having an opening therein for access by said read/write heads to said recording medium;
   a door substantially covering said opening when said cartridge is removed from the drive;
   an actuating arm having a first end and an opposing second end that is coupled to the door;
   a stationary member rigidly coupled to one of the planar surfaces; and
   a movable member coupled to the first end of the actuating arm and movably coupled to the stationary member such that movement of the door produces axial translation of the movable member, whereby said axial translation enables clamping of said medium against a planar surface of said shell when said door is closed, wherein the stationary member comprises a screw rigidly coupled to one of the planar surfaces and the movable member comprises a nut movably coupled to said screw.

15. The cartridge of claim 14 wherein the screw has screw threads disposed thereon, and the nut has nut threads disposed thereon that are capable of meshing with said screw threads.

16. The cartridge of claim 15 further comprising a spring having one end coupled to said screw and an other end coupled to said nut, said spring biasing said nut toward a clamped position.

17. The cartridge of claim 16 wherein the spring is disposed around an axis of rotation of the recording medium.

18. A cartridge for a drive in which read/write heads read/record data on a recording medium, comprising:

a shell having a front, a back and two sides between substantially flat, planar surfaces; said recording medium being in said shell;

said shell having an opening therein for access by said read/write heads to said recording medium;

a door substantially covering said opening when said cartridge is removed from the drive;

an actuating arm having a first end and an opposing second end that is coupled to the door;

a stationary member rigidly coupled to one of the planar surfaces; and a movable member coupled to the first end of the actuating arm and movably coupled to the stationary member such that movement of the door produces axial translation of the movable member, whereby said axial translation enables clamping of said medium against a planar surface of said shell when said door is closed, wherein the stationary member comprises screw threads coupled to one of the planar surfaces, and the movable member comprises a nut having nut threads that are capable of meshing with said screw threads.

19. The cartridge of claim 18 wherein the screw threads are formed on a rim of the one planar surface proximate a spindle motor aperture.

20. The cartridge of claim 19 further comprising a spring having one end coupled to said nut and an other end coupled to said one planar surface, said spring biasing said nut toward an clamped position.

* * * * *